United States Patent [19]

Mikami et al.

[11] Patent Number: 4,844,191

[45] Date of Patent: Jul. 4, 1989

[54] DISTRIBUTION TABLE STRUCTURE OF COMBINATION

[75] Inventors: Yoshiharu Mikami; Michihiro Kubo; Masao Fukuda, all of Shiga, Japan

[73] Assignee: Kabushikikaisha Ishidakoki Seisakusho, Kyoto, Japan

[21] Appl. No.: 260,780

[22] Filed: Oct. 21, 1988

[30] Foreign Application Priority Data

Oct. 21, 1987 [JP] Japan .................. 62-159929[U]

[51] Int. Cl.⁴ .................. G01G 13/00; G01G 21/28
[52] U.S. Cl. .................. 177/25.18; 177/58
[58] Field of Search .................. 177/1, 25.18, 58

[56] References Cited

U.S. PATENT DOCUMENTS

| | | | |
|---|---|---|---|
| 4,516,644 | 5/1985 | Fukuda | 177/25.18 |
| 4,534,428 | 8/1985 | Mosher et al. | 177/1 |
| 4,561,510 | 12/1985 | Sugioka et al. | 177/25.18 X |
| 4,569,405 | 2/1986 | Oshima | 177/25.18 |
| 4,596,327 | 6/1986 | Yamano | 177/25.18 X |
| 4,607,713 | 8/1986 | Nishi et al. | 177/25.18 |
| 4,688,654 | 8/1987 | Mosher et al. | 177/25.18 |

Primary Examiner—George H. Miller, Jr.
Attorney, Agent, or Firm—Browdy and Neimark

[57] ABSTRACT

The present invention device relates to a distribution table structure wherein the base end portion of a radiation trough of each head of a combination weighing system having a predetermined number of heads, each having a radiation trough and a weighing hopper connected to the tip of the radiation trough from below through a weighing hopper, are arranged circularly, is connected to the distribution table in the circumferential direction. More particularly, the present device relates to a distribution table structure wherein a tapered cone-like table main body is divided into a plurality of fan-like mutually independent segments in the circumferential direction, each of the segments is supported to a base frame through leaf springs and arranged to be independently vibrated by vibrator means such as an electromagnetic vibrator and moreover, each segment is equipped with separator flanges for its adjacent segments and provided with an independent distribution and supply function.

4 Claims, 2 Drawing Sheets

DISTRIBUTION TABLE STRUCTURE OF COMBINATION

FIELD OF THE INVENTION

The present device relates to the technical field of a distribution table structure disposed at the upper center of a combination weighing system having a plurality of heads each having a pool hopper and a weighing hopper disposed below the pool hopper are arranged circularly.

DESCRIPTION OF THE PRIOR ART

As is well known, civil consumption has become more and more vigorous with a rise in the standard of living and product processing has become very much diversified in the distribution markets handling various products.

Among the product processings described above, packaging of block-like or granular foodstuffs, or the like, in a set weight has been employed widely and has been established because it is very convenient not only for consumers but also for suppliers.

When the set weight of each package is weighed, packaging in a smaller weight must be avoided by all means and an over-weight is not preferable, either. Therefore, a technique of weighing a weight very approximate to the set weight with a very small error or in other words, so-called "combination weighing technique" based on a high speed calculation of a computer coupled with the theory of probability and statistics has been put into practical application and employed in various markets, as disclosed in many previous inventions and devices field by the present applicant, and others.

Among the prior art devices, a combination weighing system 5 shown in FIG. 3 has been employed widely. In the weighing system, products that are supplied from bucket conveyors or the like at the upper center portion are supplied to weighing hoppers 3 from pool hoppers 2 through radiation troughs 1 each disposed for each head, and the weight of the products is weighed by a weighing device such as a load cell. A computer then makes selection calculation so that the weight thus measured is equal or most approximate to a target weight as a set weight, and then opens the weighing hopper 3 of the head involved in this combination so as to feed the product into the packaging step through a shoot 4. A weighing system of the type wherein the heads are arranged circularly is used particularly widely.

In the combination weighing system 5 in accordance with the prior art technique, a distribution table 6 which connects the base end portions of radiation troughs 1 of a predetermined number of heads in the circumferential direction consists of a single sheet of a tapered cone-like table main body.

With the rise in the level of life of consumers, however, demands have been increasing in the market for a combination weighing system 5 which by itself can make combination weighing independently for a plurality of kinds of products at predetermined heads. Therefore, the combination weighing system 5 having one distribution table 6 cannot cope with such demands and development of a distribution table for distributing and supplying products by dividing in advance the products on the product supply side in accordance with their kinds has been desired.

However, the distribution table 6 in the conventional combination weighing system 5 consists of a single tapered cone-like member formed from a single sheet. Though a technique for mutually assorting the flow of products by disposing separator flanges for each type of products on the table main body is known, distribution vibration for the products inside each separator flange is applied at the same cycle and synchronously because the table main body is supported by one vibrator means such as an electromagnetic vibrator. Accordingly, distribution and supply of products to the radiation trough 1 for each product cannot be made smoothly and independently. Eventually, combination weighing or each product cannot be made accurately and as designed.

SUMMARY OF THE INVENTION

It is a technical object of the present device to solve a problem such that in the conventional combination weighing system described above, distribution and supply of products of a predetermined number of kinds to the hopper of each head cannot be made easily. In other words, the present device is intended to provide a distribution table structure of a combination weighing system which can reliably distribute and supply products in accordance with their kinds from the supply end side and is very useful for product processing technique in the distribution industry.

BRIEF DESCRIPTION OF THE DRAWINGS

The drawings are explanatory views of the first embodiment of the present device; wherein.

DETAILED DESCRIPTION OF THE PREFERRED EMBODIMENT

Figure 2:
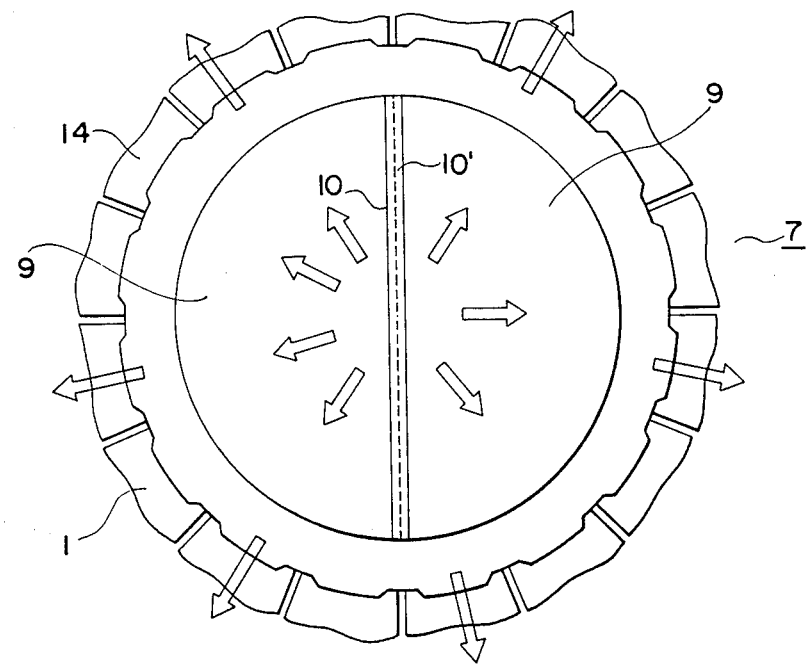
FIG. 2 is a partial plan view of the device.
Figure 3:
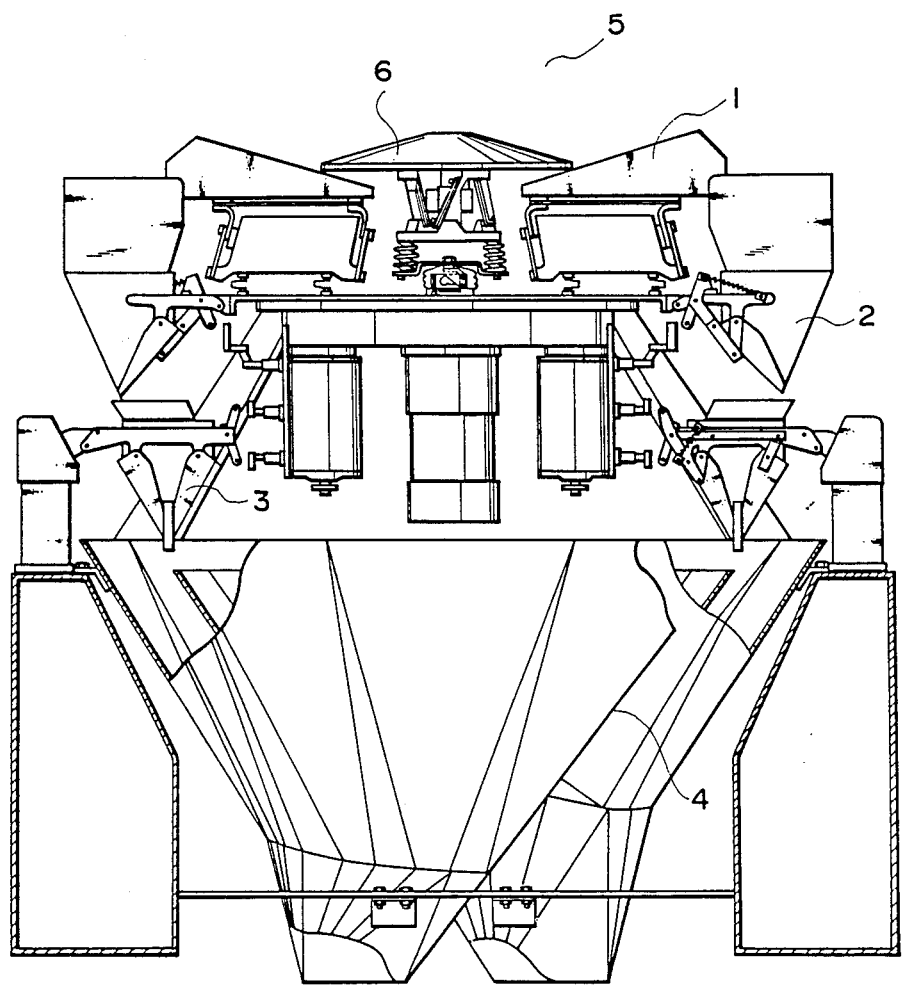
FIG. 3 is a side view of a combination weighing system.

Next, one embodiment of the present device will be described with reference to FIGS. 1 and 2. Incidentally, like reference numerals are used to identify like constituents in FIG. 3 for the purpose of description.

Reference numeral 7 represents a distribution table which constitutes the gist of the present device. It is disposed at the upper center supply portion of a combination weighing system including weighing hoppers, the heads of lower weighing hoppers and radiation troughs that are arranged in the circumferential direction in the same way as in the prior art device. Its tapered cone-like table main body 8 is divided into a predetermined number (two in this embodiment) of fan-like segments a in the circumferential direction, and each segment 9 thus divided is equipped at its base end with a separator flange 10, 10' that face the separator flange of another segment 9. In the adjacent segments 9, the upper portion of the separator flange 10 of one of the segments overlaps in an over-hang arrangement with that of the other separator 10 in order to prevent the mixture of products charged thereinto.

Figure 1:
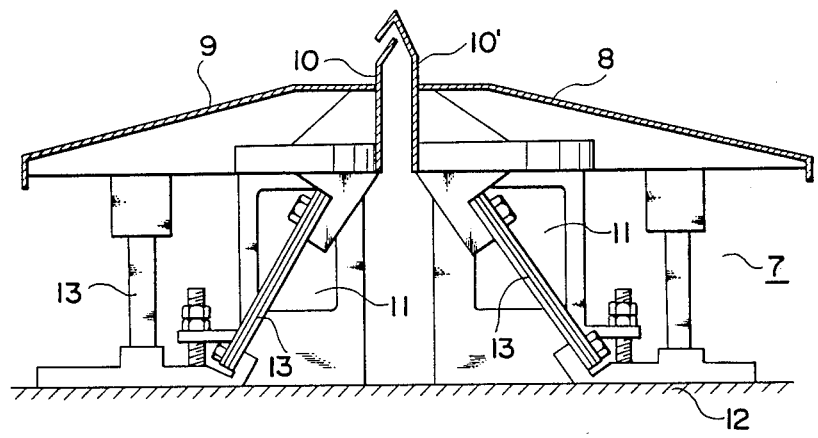
FIG. 1 is a schematic overall side view of the device.

As shown in FIG. 1, each segment 9 is equipped integrally with an independent vibrator means 11 such as an electromagnetic vibrator on its lower side and causes three-dimensional vibration. Each segment 9 is supported to a base frame 12 by leaf springs 13 that are disposed slantingly at a predetermined angle to the vibrating direction, that is, to a direction crossing the tangential direction.

A predetermined number, e.g. three, of leaf springs 13 are disposed for each segment 6 in order to insure three-dimensional vibration of each segment 9 by the vibrator means 11 and to prevent mutual interference between adjacent segments 9, 9.

Needless to say, the arrangement is employed so that no vibration is transmitted to each radiation trough that is disposed at, and connected to, the peripheral portion of each segment 6.

Therefore, if a predetermined number of bucket conveyors are disposed so as to correspond to the predetermined number of products, the product from the bucket conveyor that is charged from above is charged into each segment 3 for each segment and is prevented from mixing with the others by the separator flanges 10, 10'. In this manner, the products are distributed and supplied into the corresponding radiation troughs 12 by the independent vibration of each segment 9, and since the vibration of each segment 9 is independent and does not cause mutual interference, each segment 9 functions as if it were one distribution table.

In the construction described above, a predetermined number of bucket conveyors are arranged so that their tips face the corresponding segments, and are operated under this state. Next, when individual products are charged into weighing hoppers, each product is charged and supplied into each segment 9, vibrated three-dimensionally and conically by the vibrator means 11 and the leaf springs 13, 13, . . . and distributed and supplied as represented by arrows into each head radiation trough 1.

In this case, the products that are changed and the products that are distributed and supplied do not mix with one another because the adjacent segments 6 are partitioned by the separator flanges 10, 10'. Accordingly, these products are distributed and supplied into the corresponding radiation troughs 12.

Meanwhile, since each segment 6 is supported by the leaf springs 13, 13 . . . in such a manner as not to interfere with the others, strong vibration and mutual interference are prevented and each product is distributed and supplied into the radiation trough 1 as designed.

Needless to say, the embodiment of the present device is not particularly limited to the embodiment described above. It is possible, for example, to employ an embodiment wherein a flange as a baffle is implanted on each segment and fixed in such a manner as to extend while facing the radiation trough of each head in order to regulate effectively the flow of distribution.

As a design change, it is of course possible to increase the number of divided segments of the table main body on the distribution table to four or more.

According to the present device described above, in a combination weighing system of the type wherein the heads each having fundamentally a weighing hopper and a weighing hopper disposed below the former are disposed circularly, the distribution table as the base portion of the product supply is divided into a plurality of fan-shaped segments into the circumferential direction. Accordingly, the charged products can be supplied as a plurality of kinds of products for each segment, and the combination weighing system of the present device, though it is only one system of weighing, can make a plurality of kinds of combination weighing, and provides the advantage that flexibility can be imparted to product processing in the market.

Therefore, the number of combination weighing systems installed in the backyard of a supermarket can be reduced and moreover, the work can be carried out efficiently with improved operation efficiency.

Furthermore, design freedom of one combination weighing system can be attained, its occupying area can be reduced and interference with surrounding apparatuses or instruments can be reduced.

Each of a plurality of divided segments is equipped with the separator flange at the boundary with the adjacent segments and one of the flanges overlaps with the other in an overhang arrangement. Therefore, independence of the products charged from above can be secured on the table main body and the products do not mix mutually. Therefore, accurate combination weighing for each product can be made in combination weighing of the products.

Each segment is equipped with vibrator means such as an electromagnetic vibrator and is supported to the base frame through the leaf springs. Therefore, each segment does not interfere with the adjacent segments and its three-dimensional vibration is insured. Accordingly, distribution and supply of the products can be made accurately for each segment to the radiation trough.

Since asynchronous vibration is applied to segments as mutually independent blocks, no interference occurs between segments so that vibration and noise become less, durability can be improved and maintenance and inspection become easier accordingly.

Since it is necessary for each vibrator means and leaf spring for each segment to execute each operation only for a segment corresponding thereto, the load to them becomes small so that troubles are less liable to occur and durability can be improved.

Since combination weighing of as many kinds of products as the number of segments of the distribution table can be made by one combination weighing system, the product processing efficiency in the market can be improved and startability can be improved, whenever necessary.

What is claimed is:

1. A distribution table structure wherein the base end of a radiation trough of each head of a combination weighing system having a plurality of heads that are arranged circularly is connected to a distribution table, wherein a table main body is divided into a plurality of circumferential segments, each of said segments is supported to a base frame through springs and is equipped with vibrator means, and separator flanges are disposed between adjacent segments.

2. The distribution table structure of a combination weighing system as defined in claim 1, wherein each of said segments is completely divided and separated from each other.

3. The distribution table structure of a combination weighing system as defined in claim 1, wherein said springs are connected to said base frame for each of said segments.

4. The distribution table structure of a combination weighing system according to claim 1, wherein said separator flanges are disposed in a overlapped arrangement at boundaries between adjacent segments.

* * * * *